INVENTOR.
RICHARD K. McKIBBEN
BY Lyon & Lyon
ATTORNEYS

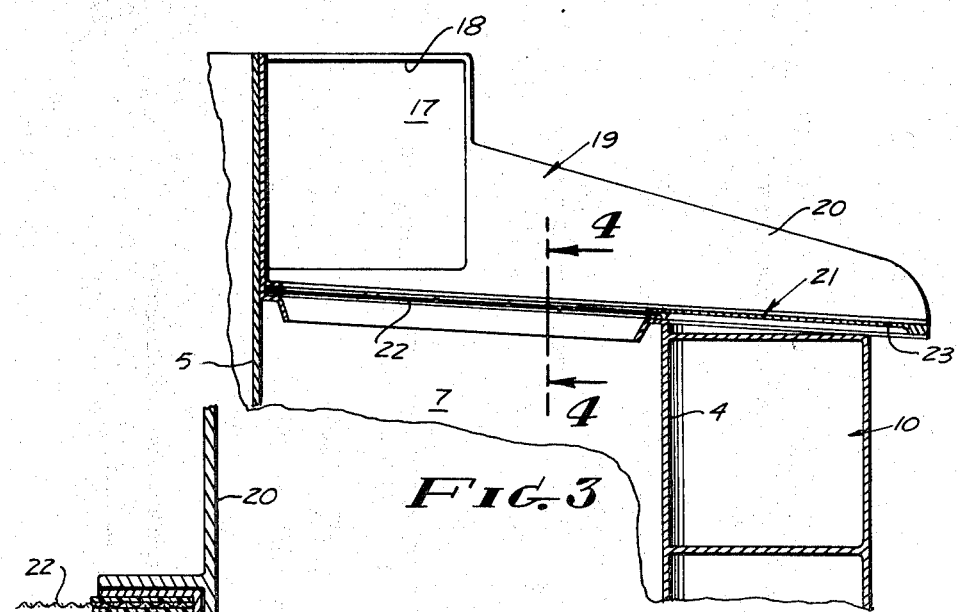
FIG. 3
FIG. 4
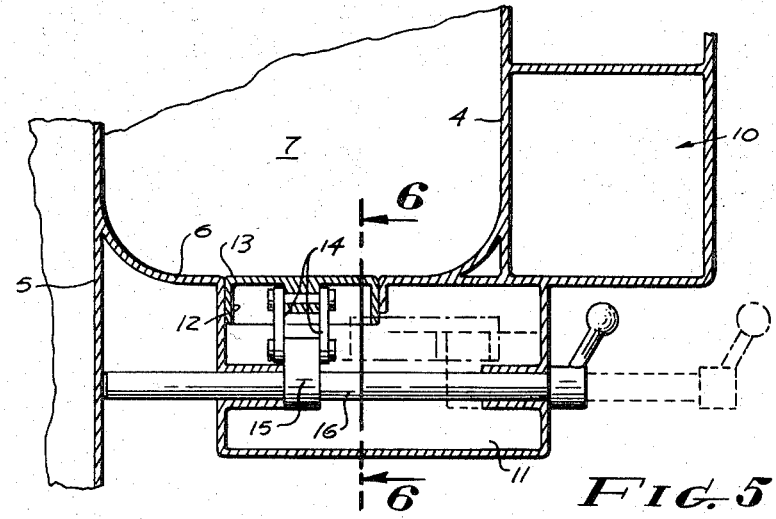
FIG. 5
FIG. 6
INVENTOR.
RICHARD K. MCKIBBEN
BY Lyon & Lyon
ATTORNEYS Jan. 12, 1971  R. K. McKIBBEN  3,553,900
VIBRATORY FINISHING APPARATUS AND METHOD
Filed Feb. 23, 1965  5 Sheets-Sheet 3

INVENTOR.
RICHARD K. McKIBBEN
BY Lyon & Lyon
ATTORNEYS

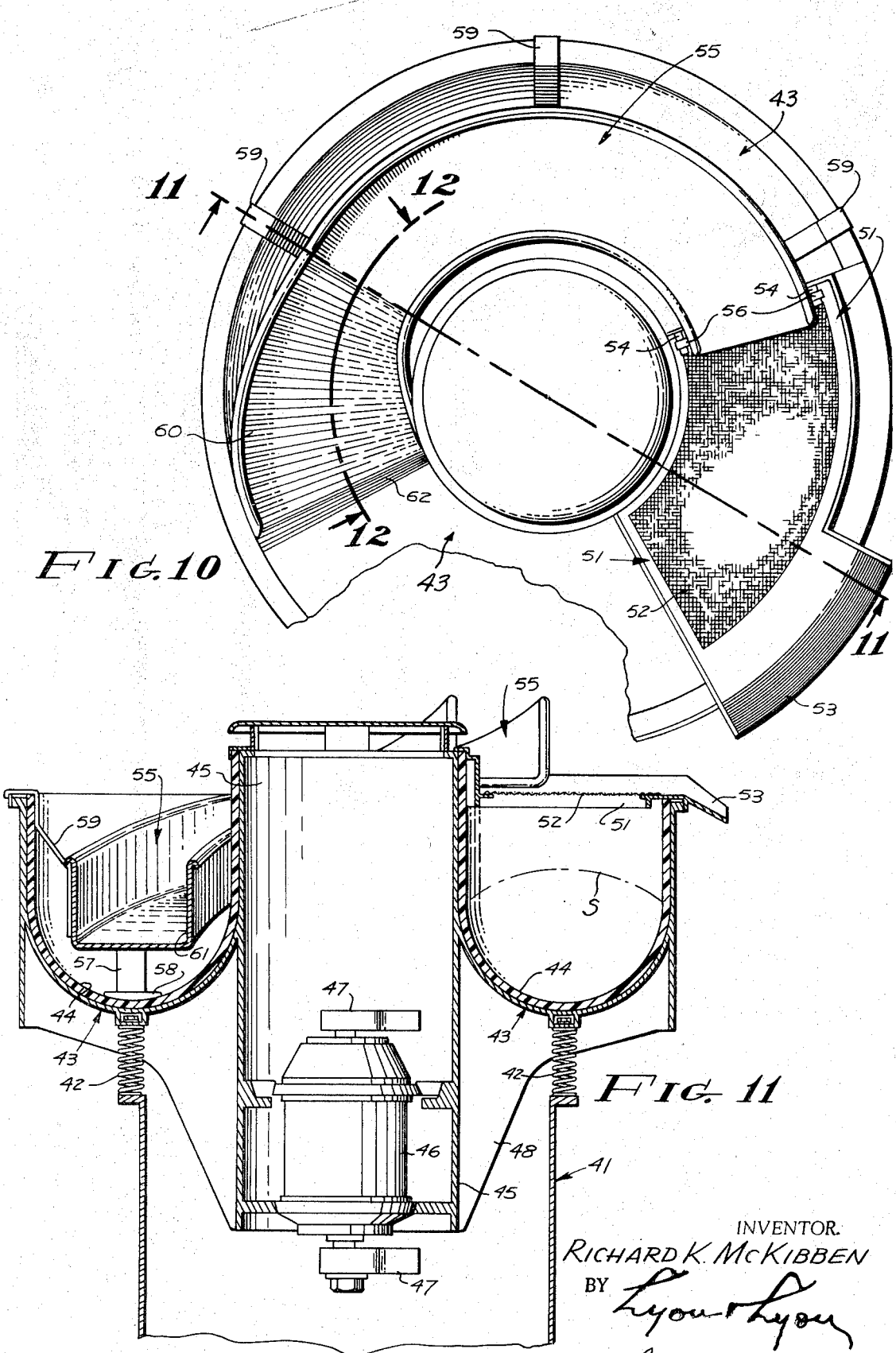

INVENTOR.
RICHARD K. McKIBBEN
BY
*Lyon r Lyon*
ATTORNEYS

United States Patent Office 3,553,900
Patented Jan. 12, 1971

3,553,900
VIBRATORY FINISHING APPARATUS AND METHOD
Richard K. McKibben, La Canada, Calif., assignor to SWECO, Inc., Los Angeles, Calif., a corporation of California
Continuation-in-part of application Ser. No. 378,644, June 29, 1964. This application Feb. 23, 1965, Ser. No. 434,317
Int. Cl. B24b 1/00, 31/02
U.S. Cl. 51—163  13 Claims

ABSTRACT OF THE DISCLOSURE

A method of and device for finishing parts using a finishing media wherein a mixture of parts and media is subjected to vibration in a lower finishing region and is moved upwardly to a region where the parts are separated from the media and the media is returned to the lower region.

---

This invention relates to vibratory finishing apparatus and method, and is a continuation-in-part of my co-pending application, Ser. No. 378,644 filed June 29, 1964, entitled Automatic Unloader for Finishing Mills now Pat. No. 3,407,542, dated Oct. 29, 1968.

Included in the objects of this invention are:

First, to provide a vibratory finishing apparatus and method wherein finishing media and parts or work pieces to be finished are subject to vibration and wherein the mixture of media and parts are transported from a lower region to an upper region, whereupon the mixture is returned by gravity to the lower level to continue the finishing operation, or the work pieces are automatically separated from the media and discharged from the apparatus and the media is returned to the lower region for reuse.

Second, to provide a vibratory finishing apparatus and method which is versatile in that the finishing operation may be varied to accomplish the most effective finishing of a wide variety of types of work pieces, whether they require a minimum amount of finishing or an extensive amount of finishing; more specifically, a quantity of work pieces may be introduced as a batch at the lower level and retained at the lower level during most of the finishing operation, then elevated while the finishing operation continues and then separated from the media and discharged from the upper level while the media is returned to the lower level, or the mixture may be cycled repeatedly between the lower and upper level until the finishing operation is completed whereupon the work pieces are discharged; or the principal finishing operation may occur during a single elevation of the mixture in which case work pieces are introduced continuously at the lower level and discharged contiuously at the upper level; or both media and work pieces may be introduced at the lower level discharged at the upper level and separated elsewhere so that the work pieces may be reintroduced with different media.

Third, to provide a vibratory finishing apparatus which includes a toroidal chamber to receive media and work pieces, an upwardly spiralling chamber disposed externally or internally of the toroidal chamber for elevating the mixture, and a means at the upper end of the helical chamber which may be arranged to return the mixture or media to the toroidal chamber, or discharge the work pieces or the entire mixture.

Fourth, to provide a vibratory finishing apparatus wherein the means for raising the media and work pieces is arranged to be attached or removed from a toroidal finishing mill of the type disclosed in Pat. No. 3,100,088 issued Aug. 6, 1963 to Heinz Leverson Podmore et al., and wherein the apparatus may be employed to perform a method of finishing in which the media and work pieces are elevated then separated, the media being returned to the chamber while the work pieces are discharged, or a method of finishing in which both media and work pieces are removed when desired.

With the above and other objects in view, as may appear hereinafter, reference is directed to the accompanying drawings, in which:

FIG. 3 is a fragmentary sectional view also substantially diagrammatical taken through 3—3 of FIG. 1.

FIG. 4 is an enlarged fragmentary cross sectional view taken through 4—4 of FIG. 3.

FIG. 5 is a substantially diagrammatical fragmentary sectional view taken through 5—5 of FIG. 1.

FIG. 6 is a fragmentary sectional view taken through 6—6 of FIG. 5.

FIG. 10 is a fragmentary plan view of a finishing mill with the unloader shown in place;

FIG. 11 is a transverse sectional view taken substantially through 11—11 of FIG. 10;

Figure 1:
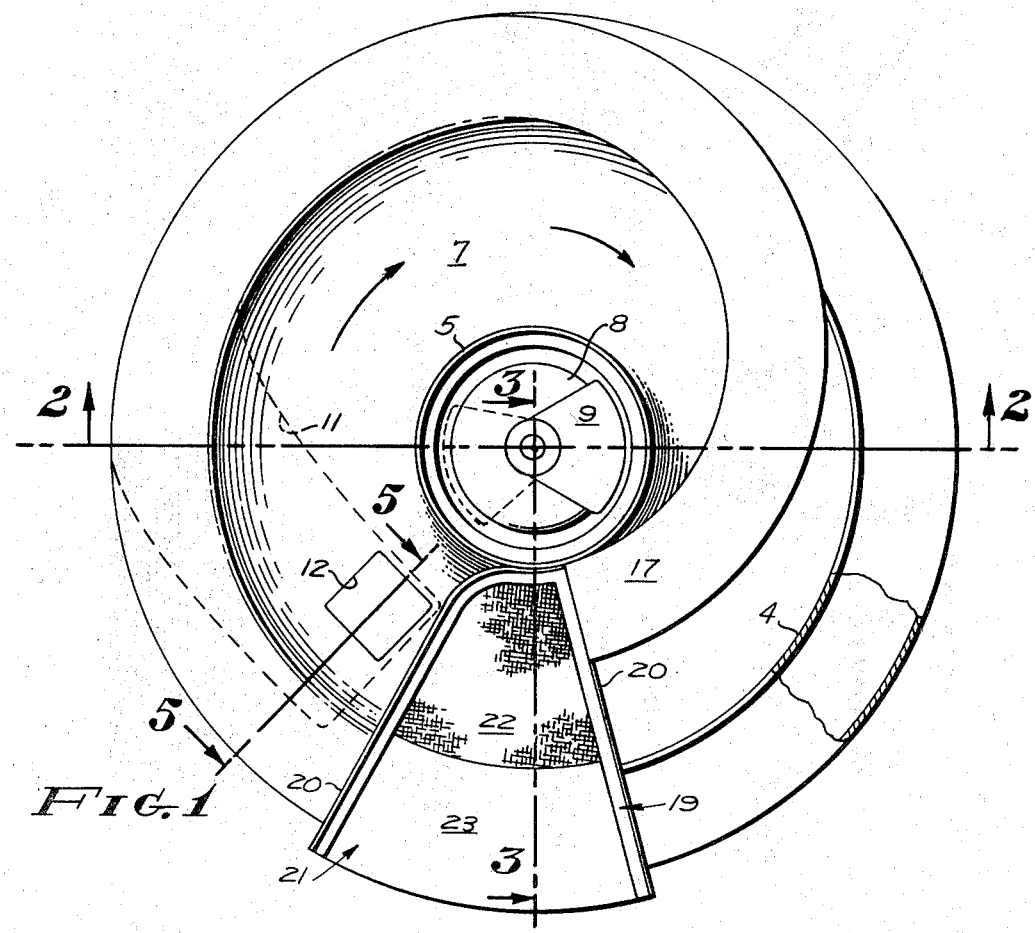
FIG. 1 is a plan view showing one form of the vibratory finishing apparatus.
Figure 2:
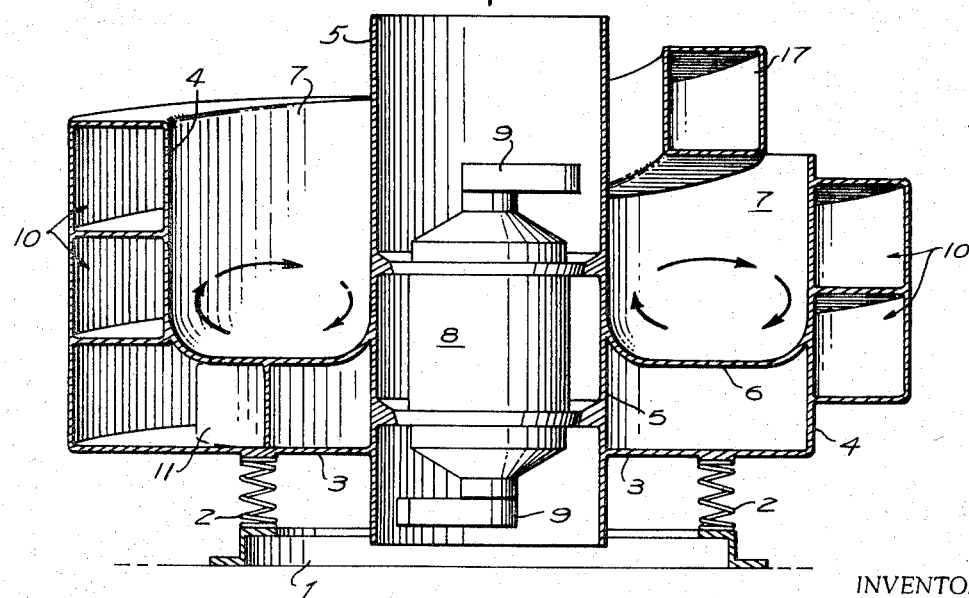
FIG. 2 is a substantially diagrammatical sectional view taken through 2—2 of FIG. 1.

Reference is first directed to FIGS. 1 through 6. The apparatus here illustrated includes a base 1 which supports a ring of springs 2. The springs in turn support a bottom structure 3. Extending upwardly from the bottom structure is an outer annular wall 4 and extending both upwardly and downwardly from the bottom structure is an inner annular wall 5. Extending between the annular walls 4 and 5 is an annular bottom member 6 spaced upwardly from the bottom structure 3. The bottom member 6 and the annular walls 4 and 5 extending upwardly therefrom define an annular chamber 7.

Mounted within the inner annular wall 5 is a motor 8, the shaft of which rotates about a vertical axis. The extremities of the motor shaft carry eccentric weights 9. The structure thus far described is generally similar to the vibration mill shown in the Podmore et al. Pat. 3,100,088 issued Aug. 3, 1963.

In the exercise of the present invention, there is mounted on the outer annular wall 4 a helical chamber 10 having several convolutions. The lower end of the helical chamber is joined to an inlet duct 11, which extends under the bottom member 6 and communicates therewith through an inlet opening 12.

The inlet opening receives a closure 13 adapted to occupy an upper position therein flush with the bottom member 6. The closure member is downwardly and then laterally movable to permit flow through the inlet opening 12. This movement is accomplished by linkage 14 attached to the closure and also attached to a lever 15, carried by a rotatable and slidable operating shaft 16 extending through the side walls of the inlet duct 11.

The upper end of the helical chamber 10 is joined to a discharge duct 17, which spirals inwardly towards the axis of the apparatus and terminates in a discharge opening 18. Mounted above the annular chamber 7 is a discharge tray 19 positioned to receive material from the discharge opening 18. The discharge tray is provided with marginal walls 20 to contain the material and is provided with a removable bottom 21 including a screen 22 confined to that portion of the tray which overlies the annular chamber 7 and an apron 23 extending beyond the radial margin of the apparatus.

The apparatus lends itself to several methods of operation, for example, that portion of the annular chamber 7 clockwise from the discharge tray 19 forms a means for receiving parts to be finished and appropriate finishing media. After introduction of a predetermined quantity of parts and media, the apparatus is vibrated by operation of the motor 8 and the eccentric weights 9 causing the mixture to churn as indicated by the arrows in FIG. 2 and at the same time to precess in the direction of the arrows shown in FIG. 1.

This operation may be continued until the parts are finished or substantially so, whereupon the closure or door 13 is opened. Continued vibration of the apparatus causes the mixture or media and parts to flow upwardly through the helical chamber 10 and discharge upon the tray 19. The media is returned to the annular chamber while the parts are discharged radially from the tray. The margins of the screen 22 and the adjacent portions of the walls 4 and 5 of the annular chamber serve as a duct for returning the media to the annular chamber.

Another method for which the apparatus is adapted may involve removal of the closure 13 or at least maintaining the closure 13 in its open position. In this case, the annular chamber is charged with finishing media. The parts are introduced into the receiving portion of the annular chamber 7 clockwise from the discharge tray 19. The mixture is continuously vibrated so that there is a continuous flow of the mixture from the annular chamber into the lower end of the helical chamber and then through the helical chamber for discharge onto the tray 19. The media is returned to the annular chamber and the parts are discharged radially. This method involves continuous operation as distinguished from batch operation and is particularly suitable where the amount of finishing required is relatively nominal; however, it should be noted that by adjustment of the eccentric weights 9, the rate at which the mixture precesses through the chamber and progresses through the helical chamber 10 may be varied so as to increase or decrease the dwell time of the media and parts in the apparatus.

In some instances, particularly where it is desired to obtain a more vigorous finishing operation, the discharge tray 19 may be removed so that during the finishing operation the entire mixture issuing from the upper level or zone of the helical chamber is returned to a lower zone formed by the annular chamber 7. Recycling of the mixture is continued until the parts are finished, whereupon the tray is reinserted to separate the parts and media.

In some instances, it is desired to use a discharge tray which is solid throughout rather than being provided with a screen 22. With this method, the parts may be first introduced into the annular chamber or lower zone with coarse finishing media and given a preliminary treatment in the lower zone before being delivered to the helical chamber or may be fed continuously from the lower zone to the helical chamber. The entire mixture is discharged from the apparatus and the parts separated from the media elsewhere, whereupon the parts are reintroduced with finer media for further processing.

It will thus be seen that because of the various methods which may be practiced with the apparatus, the apparatus and method are extremely versatile, meeting the wide variety of problems inherent in the finishing of parts of various size, shape and initial condition.

Figure 7:
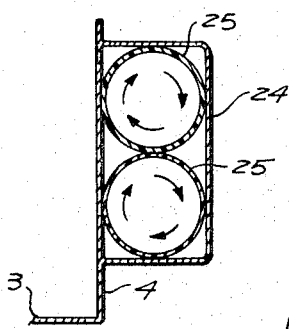
FIG. 7 is a fragmentary sectional view showing a modified form of the finishing apparatus.

Reference is directed to FIG. 7. In the first described structure, the helical chamber is formed by a helical rib joined to a peripheral wall. This arrangement involves an extensive amount of welding and requires that the duct be square or rectangular in cross section. FIG. 7 illustrates a simplified construction in which an outer annular housing 24 is provided in which is wrapped a helical tube 25, preferably formed of plastic material having good abrasion resistance. This arrangement is not only less expensive, but facilitates continuation of the churning movement indicated by the arrows in FIG. 2 and also by arrows in FIG. 7.

Figure 8:
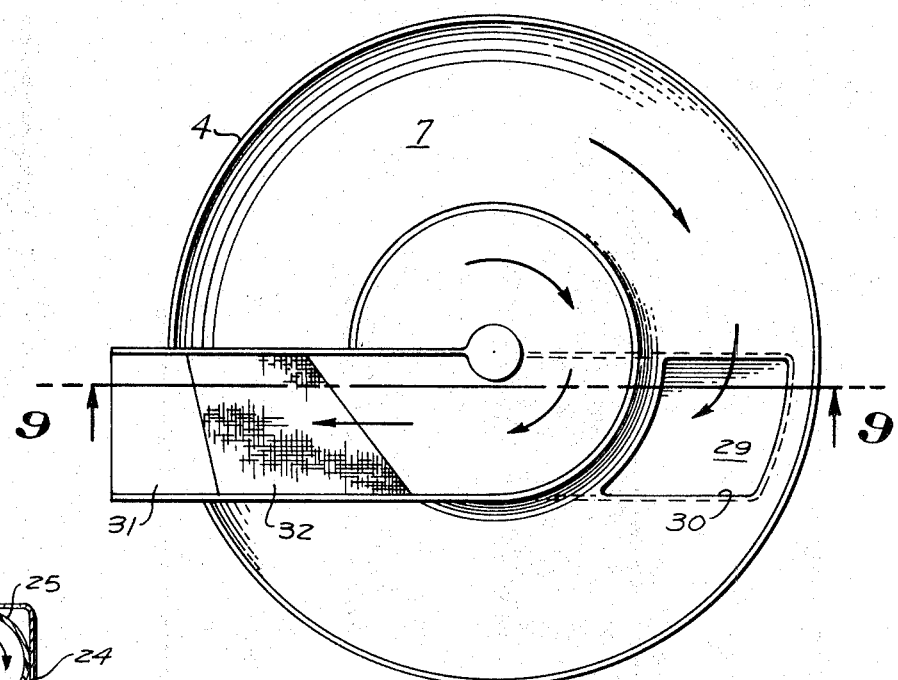
FIG. 8 is a plan view showing a further modified form of the finishing apparatus.
Figure 9:
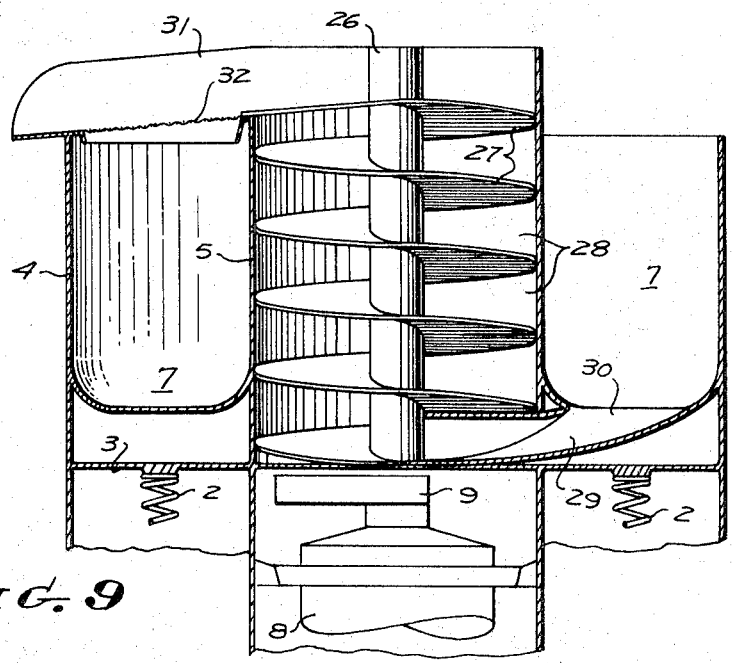
FIG. 9 is a substantially diagrammatical cross sectional view taken through 9—9 of FIG. 8.
Figure 13:
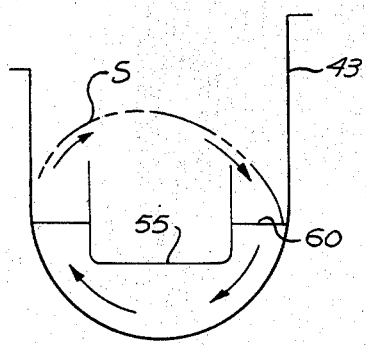
FIG. 13 is a diagrammatical fragmentary transverse sectional view to illustrate the mode of operation of the unloader.
Figure 12:
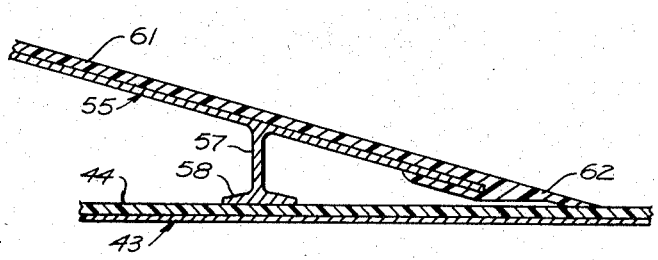
FIG. 12 is a fragmentary sectional view taken substantially through 12—12 of FIG. 10.
Figure 14:
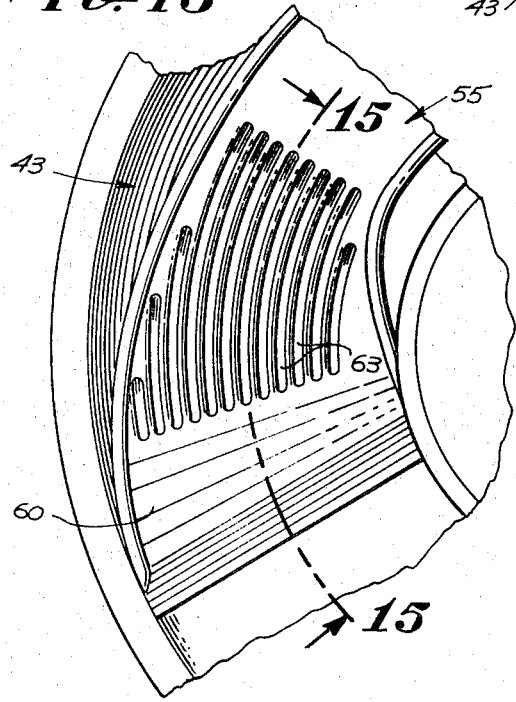
FIG. 14 is a fragmentary plan view showing the receiving end of a modified form of the unloader.
Figure 15:
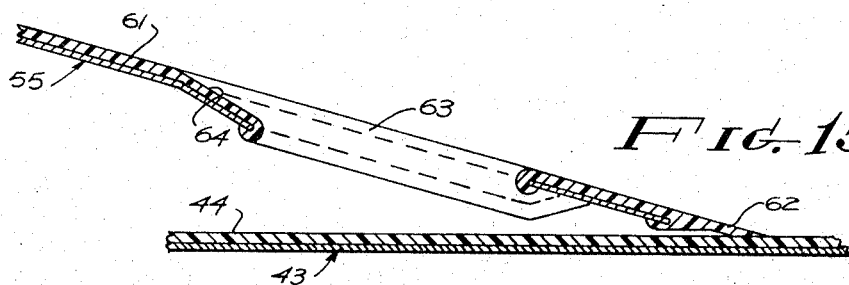
FIG. 15 is a fragmentary sectional view taken through 15—15 of FIG. 14.

Reference is now directed to FIGS. 8 and 9. The construction here illustrated differs from the first described structure in that the helical chamber is located centrally rather than peripherally with respect to the annular chamber 7. In this construction, the motor and eccentric weights are placed below the bottom structure 3 and a central post 26 extends upwardly from the bottom structure. Surrounding the central post are helical fins 27, which extend to the inner annular wall 5 and form therewith a helical chamber 28. An inlet duct 29 leads from an opening 30 in the bottom member 6 to the lower end of the helical chamber. The upper end of the helical chamber is connected to a tangentially extending duct 31, which may be in the form of a channel provided with a screen 32 located over the annular chamber 7.

To simplify the illustration, the closure 13 is omitted from the construction shown in FIGS. 8 and 9; however, it should be understood that the closure 13 may be incorporated if desired. By provision of the closure 13 and providing for removal of the screen 32 or substitution of a solid panel therefor, the apparatus shown in FIGS. 8 and 9 may be employed to perform any of the methods described in conjunction with the structure shown in FIGS 1 through 6.

Reference is now directed to FIGS. 10 through 15, wherein the means for conveying the media and parts or work pieces is readily installed or removed from an otherwise conventional vibrating mill such as shown in the aforementioned Patent 3,100,088; that is, the conveying means becomes primarily an unloader. More specifically, the type of finishing mill for which the unloader is especially adapted includes a cylindrical mounting base 41 which supports a ring of springs 42. Supported on the springs 42 is an annular or semi-toroidal container 43 having a lining 44 formed of a suitable tough and wear-resistant elastomer. In this regard, it should be noted that the previously described apparatus is, in practice, usually lined. Formed within the container is a central tube 45 which projects below the container and mounted in its lower portion is a motor 46 having eccentric weights 47 within its upper and lower extremities. The depending portion of the central tube and the container 43 is joined and reinforced by radial ribs 48. This type of mill is more fully disclosed in the aforementioned patent.

As indicated previously, when the finishing mill is in operation, the motor and eccentric weights cause the container to vibrate at high frequency and relatively low amplitude. The vibratory forces are such that finishing media containing work pieces are caused to churn in the direction of the arrows shown in FIG. 4 and also to follow a spiral path so as to circulate in a clockwise direction, as viewed in FIG. 1. The upper surface defined by the media and the work pieces contained therein corresponds essentially to the broken line S shown in FIG. 13. The nature of the media varies greatly, depending upon the size and other properties of the work pieces. Quite often, the media include a liquid or a liquid and a detergent as well as particles of appropriate size.

Heretofore, in the practice of the invention shown in the aforementioned patent, it has been customary to fill the finishing mill with a charge of appropriate media and a proportionate quantity of work pieces. The finishing mill is then operated for a predetermined length of time whereupon the media and work pieces are removed by bodily tilting the finishing mill or an appropriate opening, such as the opening 12 shown in FIGS. 1 through 6, is sometimes provided in the bottom of the mill and normally closed by a plug conforming to the interior surface of the container. In both cases, the media as well as the work pieces are removed from the mill and then must be separated from each other by other means. This involves a substantial handling problem.

In the exercise of the present invention, as represented in FIGS. 10 through 15, a removable segmental frame 51 bridges between the radially outer and radially inner walls of the container 43 and is covered by a separator screen 52. At its radially outer side, the frame 51 is provided with a discharge chute 53. At one circumferential end the frame 51 is provided with a pair of radially-spaced mounting bosses 54.

A helical ramp 55 of channel-shaped cross section is dimensioned to fit within an arcuate portion of the annular mixing chamber. One end of the ramp is provided with radially-disposed supporting pins 56 which fit in recesses provided in the mounting bosses 54 so that the pins may rest in the mounting bosses and permit limited pivotal movement of the ramp 55. The underside of the ramp is provided with one or more struts 57 terminating in feet 58 which conform to and rest on the bottom of the container 43. The struts are preferably relatively flat and are oriented so as to afford minimum resistance to the spiral flow of the media and work pieces.

Attached to the radially outer side of the ramp 55 are several centering straps 59 which fit over the outer periphery of the container 43 and have portions which bear against the outer wall of the container.

The lower end of the ramp 55 is enlarged to form a flared receiving end 60 conforming to the curvature of the container 43. The bottom and inner sides of the ramp 55 are provided with a lining 61 formed of a wear-resistance, tough elastomer similar to that used in the container 43. The lining also covers the flared receiving end 60 and extends forwardly therefrom to form a flexible lip 62.

Operation of the unloader or removable helical ramp is as follows:

During the major portion of the operating cycle of the mill, the ramp 65 is omitted from the container so that the finishing operation may take place without interference. As the finishing operation is completed, the arcuate and helical ramp is placed in the annular container. While the mill may be stopped momentarily for this purpose, it is preferred to install the ramp while the mill is in operation. Due to the vibration of the mill, the feet 68 and struts 67 as well as the ramp itself settle quickly until the feet 68 rest on the bottom of the container 43.

The finishing media and the work pieces are caused, by the vibration produced by the motor and eccentric weights, to progress up the ramp and onto the separator screen 62. The work pieces discharge from the chute 63 while the media return to the container through the screen. Some additional finishing occurs as the mixture progresses up the ramp. By adjustment of the eccentric weights, the dwell time on the ramp may be controlled to increase or decrease the proportion of the finishing operation which occurs on the ramp.

Inasmuch as the ramp is necessarily smaller than the container, it is desirable that only a predetermined portion of the contents move at any one time up the ramp. Preferably, the transverse section of the ramp is about one-half the transverse section of the charge of media and work pieces, as suggested diagrammatically in FIG. 4. consequently, excess media and work pieces spill over the receiving end of the ramp, progress around the container, and again enter the ramp. With each circular travel, additional work pieces are removed.

The ramp is left in place until it appears, from the lack of work pieces discharging from the chute, that substantially all of the work pieces have been removed, whereupon the ramp is lifted free of the milling machine and the next charge of work pieces is added to the media.

It should be noted that in most cases it is undesirable that the work pieces themselves strike each other. In a normal course of a finishing operation, the volume of media minimizes or cushions mutual engagement of the work pieces. Also, it is desirable that a substantial volume of the media be carried up the ramp so that mutual impact of the work pieces is minimized. Once the work pieces enter upon the screen 62, they tend to be separated from each other and mutually engage only as they tumble into a container or conveyor placed under the discharge chute 63.

Reference is now directed to FIGS. 5 and 6. In some instances, it is desirable to effect a partial separation of the media and work pieces in the bottom of the chute. This is accomplished by means of slots 63, the walls of which are provided with a yieldable lining 61. At the extremities of the slots toward which the end media and work pieces move, deflectors 64 are provided to raise projecting portions of the work pieces onto the bottom of the ramp 55.

While the mill has been designated a "finishing" mill, it should be understood that the term is intended to include a "deburring" or "polishing" mill as well as other mills containing work pieces and media which are subjected to vibrating action.

Also, while the separator screen is shown as secured to the mill, it may be secured to the ramp and be removable therewith; or, if it is desired to cascade both work pieces from the upper end of the ramp back to the mill, the screen may be removed; or if it is desired to empty the entire contents of the mill, a plate may be substituted for the screen to practice the methods described in connection with the first described structures.

While particular embodiments of this invention have been shown and described, it is not intended to limit the same to the exact details of the several constructions and methods set forth, and it embraces such changes, modifications, and equivalents of the parts and their formation and arrangement as come within the purview of the appended claims.

What I claim is:
1. A method for finishing a part which comprises:
 (a) introducing said part and a finishing medium to a receiving zone;
 (b) subjecting the mixture comprising said part and said finishing medium to vibration to cause said part to be finished and said mixture to travel in an upwardly directed helical path to an elevated separation zone;
 (c) separating said finishing medium and returning it to said receiving zone by means of gravity;
 (d) and discharging said part.
2. A method for finishing a part which comprises:
 (a) introducing said part and a finishing medium into a receiving zone;
 (b) subjecting the mixture comprising said part and said finishing medium to a finishing cycle which comprises vibrating said mixture to cause said part to be finished and said mixture to travel in an upwardly directed helical path to an elevated zone;
 (c) returning said mixture to said receiving zone by the force of gravity;
 (d) repeating the finishing cycle until said part is finished and said mixture is in said elevated zone;
 (e) separating said finishing medium and returning it to said receiving zone by means of gravity;
 (f) and discharging said part.
3. A finishing machine for finishing the surface of a part comprising:
 (a) housing mounted for vibration defining a vertically oriented helical finishing chamber having a zone at its lower level adapted to receive said part and a separation zone at an upper level;

(b) vibratory means operatively associated with said housing for subjecting a mixture comprising said part and a finishing material to vibration to cause finishing of said part and to cause said mixture to travel upwardly along said helical chamber;
(c) means provided in said separation zone for separating said finuishing material and part;
(d) and means for discharging said part, said finishing machine being arranged to enable said separated material to return to a lower zone of said finishing chamber by means of gravity.

4. A finishing machine for finishing the surface of a part comprising:
(a) a housing mounted for vibration defining a vertically oriented helical finishing chamber having a receiving zone at its lower level and a separation zone at an upper level;
(b) vibratory means operatively associated with said housing for subjecting a mixture comprising said part and a finishing material to vibration to cause finishing of said part and to cause said mixture to travel upwardly along said helical chamber;
(c) means provided in said separation zone for separating said finishing material and parts;
(d) means for discharging said parts;
(e) and duct means enabling said separated material to be returned to said receiving zone by means of gravity.

5. A finishing machine according to claim 4 wherein:
(a) said means for separating said finishing material comprises a foraminous member having a mesh adapted for passing said finishing material but retaining said part.

6. A finishing machine for finishing the surface of a part comprising:
(a) a housing mounted for vibration and defining a vertically oriented helical finishing chamber having a zone at its lower level adapted to receive said part and a separation zone at an upper level;
(b) vibratory means operatively associated with said housing comprising a motor positioned with its shaft oriented generally vertically for subjecting a mixture comprising said part and a finishing material to vibration to cause finishing of said part and to cause said mixture to travel upwardly along said chamber;
(c) said finishing machine being arranged to enable said mixture to return by means of gravity to a lower zone of said finishing chamber for recycling;
(d) separation means adapted to be inserted for separating said finishing material from said part and permitting said material to return to said lower zone;
(e) and means for discharging said part.

7. A finishing machine for finishing the surface of a part comprising:
(a) a housing mounted for vibration and defining a vertically oriented helical finishing chamber having a receiving zone at its lower level and a separation zone at an upper level;
(b) vibratory means operatively associated with said housing comprising a motor positioned with its shaft oriented generally vertically for subjecting a mixture comprising said part and a finishing material to vibration to cause finishing of said part and to cause said mixture to travel upwardly along said chamber;
(c) an opening provided in said separation zone with associated duct means for returning said mixture by means of gravity to said receiving zone for recycling;
(d) separation means adapted to be inserted over the opening in said separation zone when said part is finished for separating said finishing material from said part and returning it to said receiving zone by means of gravity;
(e) and means for discharging said part.

8. A finishing machine according to claim 7 wherein:
(a) said means for separating said finishing material comprises a foraminous member having a mesh adapted for passing said finishing material but retaining said part.

9. A finishing machine, comprising:
(a) means defining an annular chamber for receiving a mixture of finishing media and parts;
(b) means defining a helical chamber for receiving the mixture of finishing media and parts, and including an inlet end communicating with the bottom of said annular chamber and a discharge end at the upper portion of said annular chamber; and
(c) means for vibrating said chamber defining means to cause precession of said mixture in said annular chamber and at least partial finishing of said parts, and progression of said mixture through said helical chamber for discharge from the upper end thereof while causing said media to continue finishing of said parts.

10. A finishing machine according to claim 9 wherein:
(a) said helical chamber is disposed within said annular chamber.

11. A finishing machine according to claim 9 wherein:
(a) closure means is provided for the inlet end of said helical chamber to allow continued precession and finishing of said mixture in said annular chamber;
(b) and means is provided to open and close said closure means.

12. A method of finishing a part which comprises.
(a) introducing said part and finishing media into a lower first zone;
(b) subjecting the mixture comprising said part and said finishing media to vibration while maintaining said mixture in said first zone to cause said part to be substantially finished;
(c) therupon causing said mixture to travel upwardly to an elevated second zone while vibration of said mixture is continued;
(d) separating said part from said finishing media at said second zone;
(e) and returning said finishing media to said first zone.

13. A finishing machine, comprising:
(a) means defining an annular chamber;
(b) means defining a helical chamber including an inlet end communicating with the bottom of said annular chamber and a discharge end at the upper portion of said chamber, said helical chamber surrounding said annular chamber;
(c) said chambers adapted to receive a mixture of finishing media and parts; and
(d) means for vibrating said chamber defining means to cause precession of said mixture in said annular chamber and progression of said mixture through said helical chamber for discharge from the upper end thereof while causing said media to continue finishing of said parts.

References Cited

UNITED STATES PATENTS

| 2,760,504 | 8/1956 | Spurlin | 198—220X |
| 3,024,133 | 3/1962 | White | 198—220X |
| 3,053,380 | 9/1962 | Spurlin | 198—220 |
| 3,161,993 | 12/1964 | Balz | 51—163 |
| 3,400,495 | 9/1968 | Balz | 51—163 |
| 3,407,542 | 10/1968 | McKibben | 51—163 |

HAROLD D. WHITEHEAD, Primary Examiner

U.S. Cl. X.R.

51—313